US010055746B1

(12) United States Patent
Ling et al.

(10) Patent No.: US 10,055,746 B1
(45) Date of Patent: Aug. 21, 2018

(54) METHOD AND SYSTEM FOR OBTAINING FEEDBACK FOR A CONTENT RECOMMENDATION BY VARIOUS ALGORITHMS

(75) Inventors: Sui-Ky Ringo Ling, Rancho Palos Verdes, CA (US); Robert G. Arsenault, Redondo Beach, CA (US); Romulo Pontual, Palos Verdes Estates, CA (US); Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/529,048

(22) Filed: Jun. 21, 2012

Related U.S. Application Data (60) Provisional application No. 61/501,052, filed on Jun. 24, 2011.

(51) Int. Cl.
*H04H 60/32* (2008.01)
*G06Q 30/02* (2012.01)
*G06Q 30/06* (2012.01)
*G06F 9/455* (2018.01)
*G06F 11/34* (2006.01)
(Continued)

(52) U.S. Cl.
CPC ............ *G06Q 30/02* (2013.01); *G06F 9/455* (2013.01); *G06F 11/3457* (2013.01); *G06Q 30/0282* (2013.01); *G06Q 30/0631* (2013.01); *H04L 29/06034* (2013.01); *H04L 29/08126* (2013.01)

(58) Field of Classification Search
None
See application file for complete search history.

(56) References Cited

U.S. PATENT DOCUMENTS

| 5,594,509 A | 1/1997 | Florin et al. |
| 5,831,664 A | 11/1998 | Wharton et al. |

(Continued)

FOREIGN PATENT DOCUMENTS

| EP | 0710017 A2 | 5/1996 |
| EP | 1471690 A2 | 10/2004 |
| WO | 01/47248 A2 | 6/2001 |

OTHER PUBLICATIONS

Non-final Office action dated Oct. 22, 2013 in U.S. Appl. No. 13/803,395, filed Mar. 14, 2013 by Romulo Pontual et al.
(Continued)

*Primary Examiner* — Jonathan V Lewis
(74) *Attorney, Agent, or Firm* — Harness, Dickey & Pierce, PLC (57) ABSTRACT

A simulation engine and method of operating a simulation system includes a plurality of user devices and an interface receiving user device data and a recommendation request from at least one the plurality of user devices. The system also includes a memory storing the user device data therein. The system also includes a recommendation engine that generates a content recommendation based on the user device data and an algorithm. The interface communicates the content recommendation to the user device. The recommendation engine receives a recommendation rating from at least one of the plurality of user devices and changes the algorithm in response to the recommendation rating. The user device receives a different recommendation of the changed algorithm within the simulation engine.

27 Claims, 11 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 5,842,199 A * | 11/1998 | Miller et al. | |
| 5,983,214 A * | 11/1999 | Lang et al. | |
| 6,016,475 A * | 1/2000 | Miller | G06F 17/30867 |
| | | | 705/26.7 |
| 6,526,581 B1 | 2/2003 | Edson | |
| 6,882,299 B1 | 4/2005 | Allport | |
| 6,970,127 B2 | 11/2005 | Rakib | |
| 6,990,635 B2 * | 1/2006 | Kurapati et al. | 715/747 |
| 7,093,273 B2 | 8/2006 | Marsh | |
| 7,254,829 B1 | 8/2007 | Brown et al. | |
| 7,571,452 B2 | 8/2009 | Gutta | |
| 7,581,237 B1 | 8/2009 | Kurapati | |
| 7,895,625 B1 * | 2/2011 | Bryan et al. | 725/46 |
| 7,895,626 B2 * | 2/2011 | Georgis | G06Q 30/02 |
| | | | 725/46 |
| 8,082,572 B1 | 12/2011 | Tilford | |
| 8,583,791 B2 * | 11/2013 | Svendsen | G06F 17/30017 |
| | | | 705/12 |
| 8,607,284 B2 | 12/2013 | Li et al. | |
| 9,342,287 B2 * | 5/2016 | Muller | G06F 8/60 |
| 9,734,507 B2 * | 8/2017 | Amidon | G06Q 10/10 |
| 2001/0039520 A1 | 11/2001 | Nakade et al. | |
| 2002/0056112 A1 | 5/2002 | Dureau et al. | |
| 2002/0078172 A1 | 6/2002 | Yoshikai et al. | |
| 2002/0104087 A1 * | 8/2002 | Schaffer et al. | 725/46 |
| 2002/0154888 A1 | 10/2002 | Allen et al. | |
| 2002/0174429 A1 * | 11/2002 | Gutta et al. | 725/46 |
| 2003/0084448 A1 | 5/2003 | Soundararajan | |
| 2003/0220830 A1 * | 11/2003 | Myr | 705/10 |
| 2003/0233650 A1 | 12/2003 | Zaner et al. | |
| 2003/0237093 A1 * | 12/2003 | Marsh | 725/46 |
| 2004/0006698 A1 | 1/2004 | Apfelbaum | |
| 2004/0244029 A1 * | 12/2004 | Gross | 725/9 |
| 2004/0255326 A1 | 12/2004 | Hicks et al. | |
| 2005/0050578 A1 * | 3/2005 | Ryal | 725/143 |
| 2005/0055640 A1 | 3/2005 | Alten | |
| 2005/0099493 A1 | 5/2005 | Chew | |
| 2005/0186988 A1 | 8/2005 | Lim et al. | |
| 2005/0204392 A1 | 9/2005 | Na | |
| 2005/0278737 A1 | 12/2005 | Ma et al. | |
| 2006/0085835 A1 | 4/2006 | Istvan et al. | |
| 2006/0101338 A1 | 5/2006 | Kates | |
| 2006/0212448 A1 * | 9/2006 | Bogle | G06Q 10/00 |
| 2006/0294548 A1 | 12/2006 | Potrebic et al. | |
| 2007/0157249 A1 | 7/2007 | Cordray et al. | |
| 2007/0169148 A1 * | 7/2007 | Oddo et al. | 725/46 |
| 2007/0186241 A1 | 8/2007 | Sugimoto et al. | |
| 2007/0186243 A1 * | 8/2007 | Pettit et al. | 725/46 |
| 2007/0220554 A1 * | 9/2007 | Barton et al. | 725/46 |
| 2008/0066011 A1 | 3/2008 | Urrabazo et al. | |
| 2008/0077852 A1 | 3/2008 | Fleishman et al. | |
| 2008/0092169 A1 | 4/2008 | Shannon et al. | |
| 2008/0109866 A1 | 5/2008 | Thomas et al. | |
| 2008/0120656 A1 | 5/2008 | Jupin | |
| 2008/0127253 A1 | 5/2008 | Zhang et al. | |
| 2009/0100478 A1 | 4/2009 | Craner et al. | |
| 2009/0133059 A1 | 5/2009 | Gibbs et al. | |
| 2009/0158342 A1 * | 6/2009 | Mercer et al. | 725/46 |
| 2009/0178081 A1 * | 7/2009 | Goldenberg et al. | 725/46 |
| 2009/0199283 A1 | 8/2009 | Jain | |
| 2009/0202218 A1 | 8/2009 | Inatomi et al. | |
| 2009/0217332 A1 | 8/2009 | Hindle et al. | |
| 2009/0262661 A1 | 10/2009 | Ueda et al. | |
| 2010/0046931 A1 | 2/2010 | Takao et al. | |
| 2010/0064325 A1 * | 3/2010 | Fishman et al. | 725/61 |
| 2010/0162335 A1 | 6/2010 | Davis | |
| 2010/0205628 A1 | 8/2010 | Davis et al. | |
| 2010/0251305 A1 | 9/2010 | Kimble et al. | |
| 2010/0333142 A1 | 12/2010 | Busse et al. | |
| 2011/0090402 A1 | 4/2011 | Huntington et al. | |
| 2011/0184899 A1 | 7/2011 | Gadanho et al. | |
| 2011/0214148 A1 | 9/2011 | Gossweiler et al. | |
| 2012/0011550 A1 | 1/2012 | Holland | |
| 2012/0078937 A1 | 3/2012 | Hall | |
| 2012/0089923 A1 | 4/2012 | Pettit et al. | |
| 2012/0095675 A1 | 4/2012 | Slothouber et al. | |
| 2012/0117017 A1 | 5/2012 | Phillips et al. | |
| 2012/0174155 A1 | 7/2012 | Mowrey et al. | |
| 2012/0174158 A1 | 7/2012 | Mowrey et al. | |
| 2012/0303138 A1 | 11/2012 | Demskie | |
| 2012/0303415 A1 * | 11/2012 | Edelson | G06Q 30/0282 |
| | | | 705/7.32 |
| 2012/0323674 A1 * | 12/2012 | Simmons | G06Q 30/02 |
| | | | 705/14.41 |
| 2013/0326552 A1 | 12/2013 | Adams | |
| 2013/0326563 A1 | 12/2013 | Mulcahy et al. | |
| 2014/0025609 A1 * | 1/2014 | Coster | G06Q 30/0631 |
| | | | 706/12 |
| 2014/0067961 A1 | 3/2014 | Archibong et al. | |
| 2014/0089982 A1 | 3/2014 | Narahara et al. | |
| 2014/0109139 A1 | 4/2014 | Jeon et al. | |
| 2014/0245357 A1 | 8/2014 | Huntington et al. | |

OTHER PUBLICATIONS

Final Rejection dated Sep. 17, 2014 in U.S. Appl. No. 13/529,040, filed Jun. 21, 2012 by Romulo Pontual et al.
Non-final Office action dated Apr. 23, 2014 in U.S. Appl. No. 13/529,040, filed Jun. 21, 2012 by Romulo Pontual et al.
Final Rejection dated Apr. 10, 2014 in U.S. Appl. No. 13/803,395, filed Mar. 14, 2013 by Romulo Pontual et al.
Non-final Office action dated Sep. 30, 2014 in U.S. Appl. No. 13/803,395, filed Mar. 14, 2013 by Romulo Pontual et al.
Non-final Office action dated Jan. 23, 2015 in U.S. Appl. No. 13/529,040, filed Jun. 21, 2012 by Romulo Pontual et al.
Final Rejection dated Mar. 30, 2015 in U.S. Appl. No. 13/803,395, filed Mar. 14, 2013 by Romulo Pontual et al.
Final Rejection dated Jun. 18, 2015 in U.S. Appl. No. 13/529,040, filed Jun. 21, 2012 by Romulo Pontual et al.
Non-final Office action dated Jun. 8, 2016 in U.S. Appl. No. 13/529,040, filed Jun. 21, 2012 by Romulo Pontual et al.
Non-final Office action dated Nov. 19, 2015 in U.S. Appl. No. 13/803,516, filed Mar. 14, 2013 by Romulo Pontual et al.
Colombian Office action dated Jul. 2, 2015 in Colombian Patent Application No. 14-006.899 filed Jun. 7, 2012 by Romulo Pontual et al.

* cited by examiner

*History Builder* — 1010

Select APG Data: APG Data 1 — 1020

Search for Programs to Add

Program | Category: APG Data 1

Date: December 2010
| Su | Mo | Tu | We | Th | Fr | Sa |
|----|----|----|----|----|----|----|
| 28 | 29 | 30 | 1  | 2  | 3  | 4  |
| 5  | 6  | 7  | 8  | 9  | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | 1  |
| 2  | 3  | 4  | 5  | 6  | 7  | 8  |

Time From
To

Search

| Program | Date | Time |
|---------|------|------|
| Community | 1/1/2010 | 9:00 PM |
| Rachel Maddow | 5/12/2010 | 7:00 AM |
| Bill O'Reilly | 11/4/2010 | 3:00 PM |
| ESPN Sportscenter | 4/23/2010 | 5:30 PM |
| Dexter | 5/12/2010 | 11:00 PM |
| Guiding Light | 11/4/2010 | 8:00 PM |

Date          Time
○ Daily  ○ Weekly  ○ Weekdays
Add

Load Log: November Log — 1012

Events to Log — 1014

| Program | Date — 1016 | Time — 1018 |
|---------|------|------|
| Community | 11/1/2010 | 9:00 PM |
| Rachel Maddow | 11/12/2010 | 7:00 AM |
| Bill O'Reilly | 11/4/2010 | 3:00 PM |
| ESPN Sportscenter | 11/23/2010 | 5:30 PM |
| Dexter | 11/12/2010 | 11:00 PM |
| Guiding Light | 11/4/2010 | 8:00 PM |

< Prev 1 2 3 4 5 6 7 8 Next >

Save
Execute
Export

FIG. 11

METHOD AND SYSTEM FOR OBTAINING FEEDBACK FOR A CONTENT RECOMMENDATION BY VARIOUS ALGORITHMS

CROSS-REFERENCE TO RELATED APPLICATIONS

This application claims the benefit of U.S. Provisional Application No. 61/501,052, filed on Jun. 24, 2011. The entire disclosure of the above application is incorporated herein by reference.

TECHNICAL FIELD

The present disclosure relates generally to providing recommendation for content users, and, more specifically, to a method and system for obtaining feedback for a content recommendation system.

BACKGROUND

The statements in this section merely provide background information related to the present disclosure and may not constitute prior art.

Television programming content providers are increasingly providing a wide variety of content to consumers. Available content is typically displayed to the user using a grid guide. The grid guide typically includes channels and time slots as well as programming information for each information time slot. The programming information may include the content title and other identifiers such as actor information and the like.

Because the number of channels is so great, all of the channels cannot be simultaneously displayed on the screen display. A user can scroll up and down and sideways to see various portions of the program guide for different times and channels. Because of the large number of content titles, time slots and channels, it is often difficult to decide on a program selection to view.

SUMMARY

The present disclosure provides a system and method for generating recommendations based upon viewing data from various users using a recommendation algorithm, obtaining user feedback on those recommendations, modifying or replacing the recommendation algorithm accordingly.

In one aspect of the disclosure, a method includes communicating user device data through a network to a simulation engine, communicating a recommendation request from the user device to the simulation engine, generating a content recommendation from a recommendation engine of the simulation engine based on the user device data and an algorithm in response to the recommendation request, communicating the content recommendation to the user device through the network, rating the content recommendation at the user device to form recommendation rating, communicating the recommendation rating to the simulation engine, changing the algorithm in response to the recommendation rating.

In a further aspect of the disclosure, a simulation engine in communication with a plurality of user devices includes an interface receiving user device data and a recommendation request from at least one of the plurality of user devices. The simulation engine also includes a memory storing the user device data therein. The simulation engine also includes a recommendation engine that generates a content recommendation based on the user device data and an algorithm in response to the recommendation request. The interface communicates the content recommendation to the user device. The recommendation engine receives a recommendation rating from at least one of the plurality of user devices and changes the algorithm in response to the recommendation rating.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Figure 1:
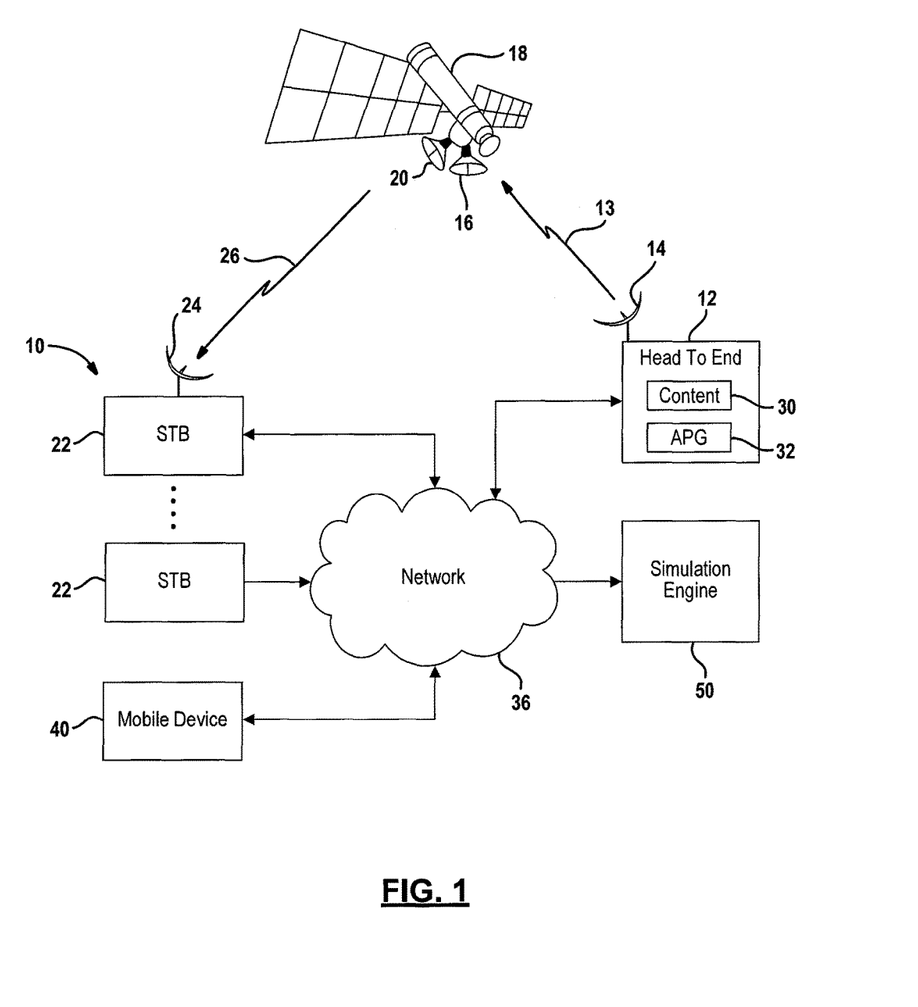
FIG. 1 is a high level block diagrammatic view of a recommendation system according to the present disclosure.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. As is illustrated the receiving systems are referred to as a set top box 22. Each set top box 22 is in communication with a respective antenna 24. Each antenna 24 receives downlink signals 26 from the transmitting antenna 20 of the satellite 18.

The head end 12 may communicate various content 30 or program guide data 32 through the satellite 18. The set top box 22 may receive the content 30 and program guide data 32 for use therein. A plurality of set top boxes 22 may be in communication with the head end 12 through a network 36. The network 36 may be one type of network or multiple types of networks. The network 36 may, for example, be a public switch to telephone network, the internet, a mobile telephone network or other type of network.

A mobile device 40 may also be incorporated in the system 10. The mobile device 40 may also receive downlink signals from the satellite 18. The mobile device may also be in communication through a wireless network to the head end 12.

A simulation engine 50 for generating and applying recommendation algorithms is also provided within the system 10. The simulation engine 50 may receive data from the set top boxes 22 and mobile device 40. The simulation engine 50 may, for example, may be a web-based system. The simulation engine 50 communicates content recommendations to the set top box 22 based on an algorithm and user device data. Likewise, the feedback as to the content recommendations may be provided from the set top boxes 22 to the simulation engine 50 through the network 36. The content recommendations may be a list of content such as regularly watched content or related content that is currently available or upcoming. Interaction of the various components of the system through the network is set forth below. It should be noted that although the simulation engine 50 is illustrated as a separate component, the simulation engine 50 may also be incorporated into the head end 12 or another system.

Figure 2:
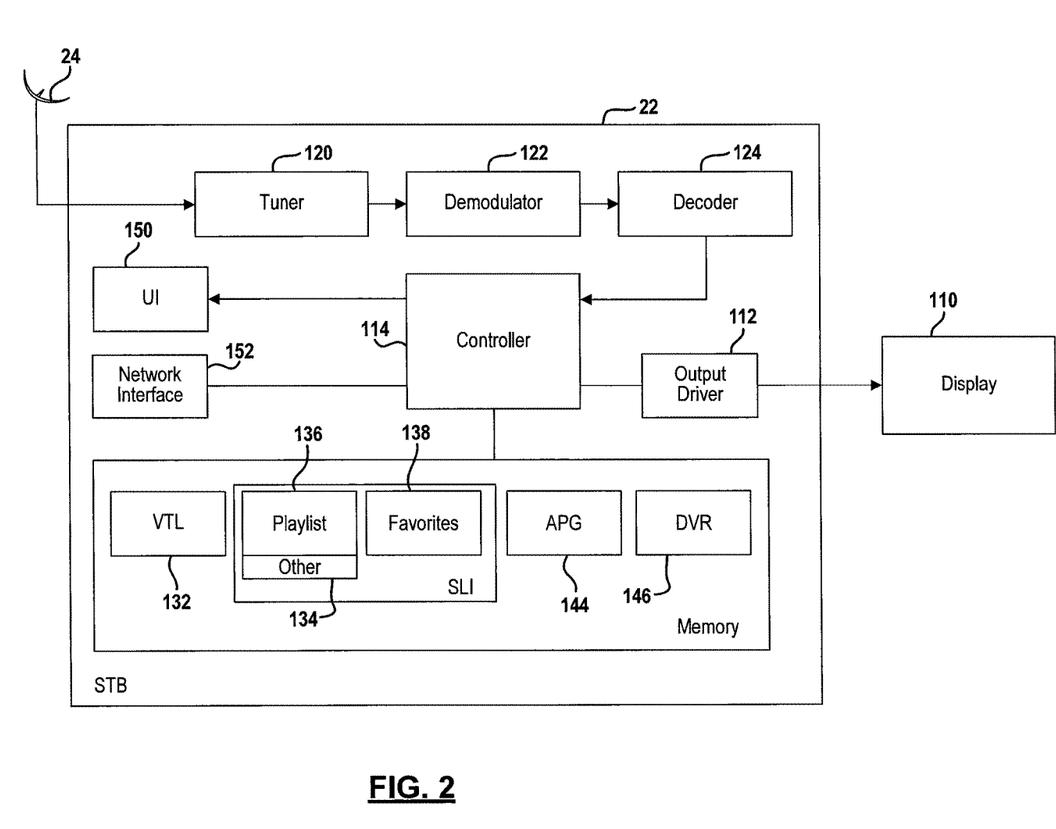
FIG. 2 is a blocked diagrammatic view of the user device of FIG. 1.

Referring now to FIG. 2, a user device, such as a set top box 22 is illustrated in further detail. Although, a particular configuration of the set top box 22 is illustrated, it is merely representative of various electronic devices with an internal controller used as a content receiving device. The antenna 24 may be one of a number of different types of antennas that includes one or more low noise blocks. The antenna 24 may be a single antenna 24 used for satellite television reception. The set top box 22 may be coupled to a display 110. The display 110 may have an output driver 112 within the set top box 22. A mobile device such as that described above may have an omni-directional antenna.

A controller 114 may be a general processor such as a microprocessor that cooperates with control software. In the present example the control software is not changed to perform searching since data is communicated to a central location such as the simulation engine as described below. The controller 114 may be used to coordinate and control the various functions of the user device 22. These functions may include a tuner 120, a demodulator 122, a decoder 124 such as a forward error correction decoder and any buffer or other functions.

The tuner 120 receives the signal or data from the individual channel. The tuner may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multifunctional controller.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for various operational data collected during operation of the set top box 22. One type of data storage includes the viewer tracking log 132. The viewer tracking log (VTL) 132 may have data about details of programs that have been watched or played back, including what time that they were watched or played back. The VTL data 132 may also include how long they were watched and program details. Recording deletion data within a digital video recorder may also be included in the VTL memory 132. Recording deletion data corresponds to previous recording deleted from the digital video recorder.

Another type of memory 130 is the settings and the list information (SLI) memory 134. The SLI memory 134 may store various types of data including set top box playlist data 136 that has the playlist for content recorded within the set top box 22. The playlist data contains content visible to users and content currently non-visible to users. Another type of data is the favorite settings for the set top box 22. The favorites may be stored in a favorite's memory 138. Other types of data may also be included in the SLI memory 134 which is illustrated as an "other" data memory 140. The other data memory 140 may include various types of data including ignored suggestions which correspond to Suggestion or recommendation suggestions that were ignored. Another type of data in the other data memory 140 may include the channel subscription data, the blocked channels, adult channels, rating limits set by the set top box 22, current set top box language, prioritizer data, TV resolution data, to do list data, the conditional access module identifier, and a request identifier. The request identifier may be generated at the simulation engine 50 of FIG. 1 as is further described below. Further, time zone data, time of day data, daylight savings data, status data, aspect ratio data, viewing hours data, quick tune list data and a zip code data may all be included within the other memory 140 of the SLI memory 134.

The memory 130 may also include advanced program guide memory 144. The advanced program guide (APG) memory 144 may store program guide data that is received within the system. The program guide data may store various amounts of data including two or more weeks worth of program guide data. The program guide data from the APG memory 144 may be communicated in various manners including through the satellite 18 of FIG. 1. The program guide data may include program identifiers, (PID), and various data objects corresponding thereto. The program data objects may include program characteristics for each program content. The program characteristic may include ratings, categories, actor, director, writer, content identifier and producer data. The data may also include various other settings.

The memory 130 may also include a digital video recorder 146. The digital video recorder 146 may be a hard drive, flash drive, or other memory device. A record of the content stored in the digital video recorder is a playlist. The playlist may be stored in the DVR 146 or a separate memory as illustrated.

The set top box 22 may also include a user interface 150. The user interface 150 may be various types of user interfaces such as a keyboard, push buttons, a touch screen, a voice activated interface or the like. The user interface 150 may be used to select a channel, select various information, change the volume, change the display appearance, or other functions. The user interface 150 may also be used for selecting recommendation and providing feedback for recommendations as will be described below.

A network interface 152 may be included within the user device 22 to communicate various data through the network 36 illustrated above. The network interface 152 may be a WiFi, WiMax, WiMax mobile, wireless, cellular, or other types of communication systems.

The network interface 152 may be used for communicating the SLI data, the VTL data, and various other types of data collected at the set top box 22. The network interface 152 may communicate the data to the head end or the simulation engine. The network interface 152 may use various protocols for communication therethrough including, but not limited to, hypertext transfer protocol (HTTP).

Figure 3:
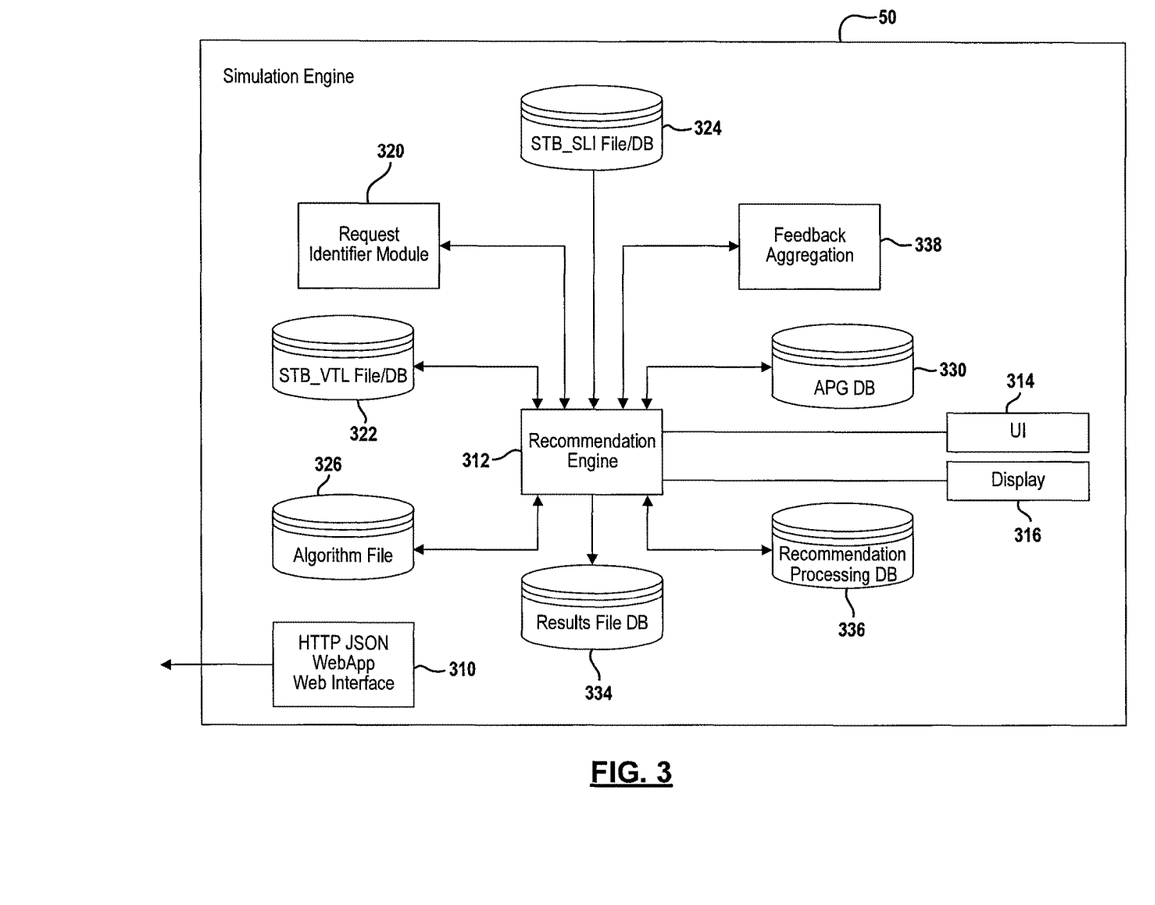
FIG. 3 is a high level block diagrammatic view of the simulation engine of FIG. 1.

Referring now to FIG. 3, the simulation engine 50 illustrated in FIG. 1 is further described below. The simulation engine 50 may include a web interface 310 for interfacing with the network 36 illustrated in FIG. 1. One suitable type of web interface 310 is a hypertext transfer protocol (HTTP) java script object notation (JSON) web application. Of course other suitable interfaces may be used. The web interface 310 may be used to obtain and communicate various information to the set top boxes 22.

The simulation engine 50 includes a recommendation engine 312. The recommendation engine 312 may be microprocessor-based and performs various functions including receiving data from the set top boxes, processing the data from the set top boxes to generate recommendations and adjust algorithms, and storing the data within various databases generating recommendations based upon the data.

The recommendation engine 312 is in communication with a user interface 314. The user interface 314 allows a system operator to create and change algorithms being used to provide recommendations to the set top boxes. The user interface will also allow results to be analyzed and allow specific algorithms to be run on a selected set of data for testing purposes. The user interface 314 may be used in conjunction with a display 360. The display 360 may be a computer monitor or the like. Various screen displays will be described below.

The simulation engine 50 includes a request identifier module 320. The request identifier module 320 generates a request identifier in response to a request from a set top box. The request identifier module 320 communicates the request through the web interface 310 to the set top box. The request identifier may be used in the communication between the set top box 22 and the simulation engine 50 for identification purposes.

The recommendation engine 312 is in communication with a set top box viewer tracking log (VTL) database. The viewer tracking log data may also include playlist, favorite channels and other viewer tracking log data described above. The set top box database 322 stores the data which corresponds to a particular set top box.

A set top box settings and list information database 324 stores the set top box setting and list information into a database corresponding to each set top box or user device.

The recommendation engine 312 is also in communication with an algorithm file 326.

The algorithm file stores the algorithm for generating recommendations therein. As mentioned above the algorithm file may be changed over time by operator intervention to provide better results for the recommendation engine 312.

The advance program guide (APG) database 330 may also be in communication with the recommendation engine 312. The advance program guide database 330 includes program guide data such as object identifiers and channel identifiers, which are used to identify television stations, program start times and other data necessary for providing recommendations.

The recommendation engine produces a human readable results file that is stored in a recommendation results database 334. The recommendation results database 334 contains a list of program object identifiers of recommended programs, the channel identifier or station identifier, and a program start time and other content related content. Further data may also be provided. The algorithm identifier may also be provided with the results file.

A recommendation processing database 336 may also be in communication with the recommendation engine 312. The recommendation processing database 336 is used to store the content results that the algorithm produces and later correlate the content results to the feedback coming from the set top boxes. A feedback aggregation module 338 may use the recommendation processing database 336 to perform the correlation of the feedback coming from the user devices and determine whether the recommendations are relevant.

Figure 4:
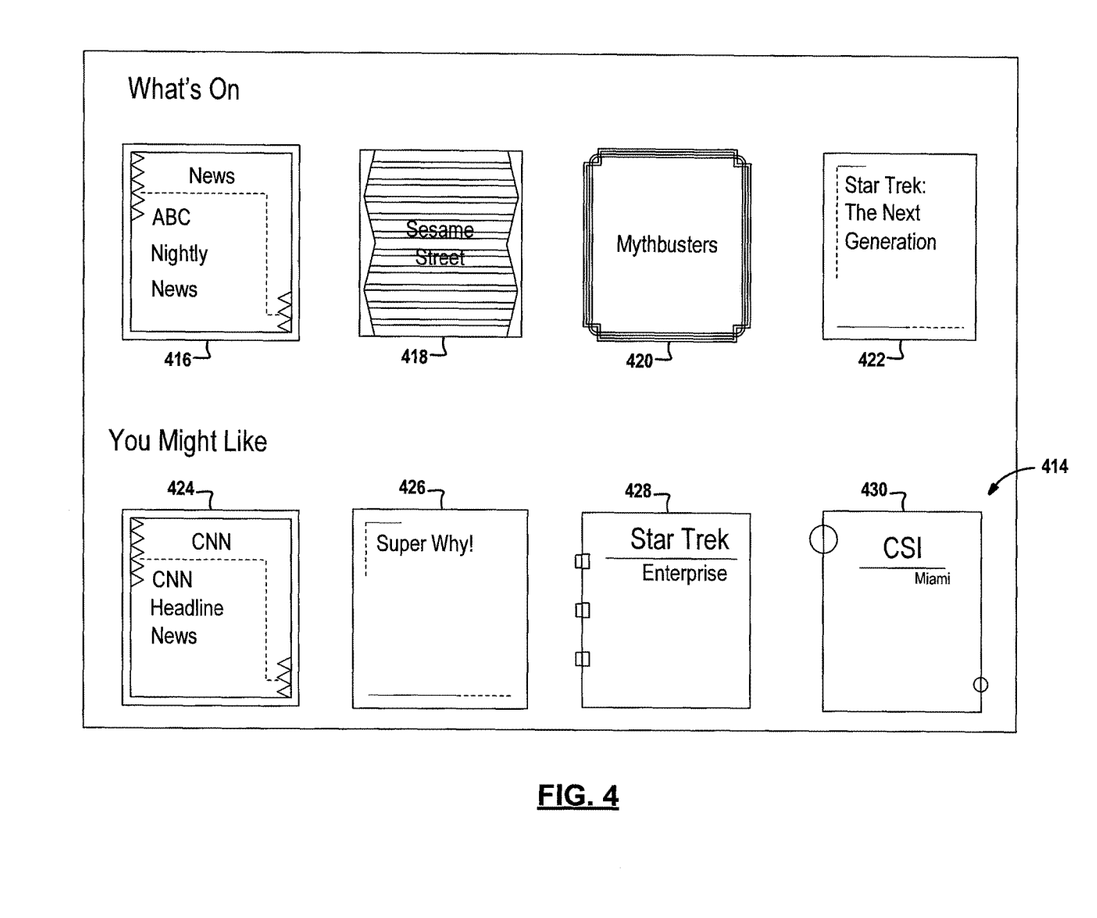
FIG. 4 is a screen display of example of a recommendations screen that may be generated by the present disclosure.

Referring now to FIG. 4, one example of the recommendation process results is a recommendations screen 410 which is broken down into a What's On portion 412 and a You Might Like portion 414. The What's On program list has program content titles for programs that are regularly watched during a current time slot. The program content in the What's On list is content that is currently being broadcast. The What's On list may include a plurality of thumbnails for 416, 418, 420, and 422. An alphanumeric list may also be provided in addition to or in place of the thumbnails. The television or display associated with the set top box may be directly tuned by selecting one of the thumbnails 416-422 using the user interface.

The You Might Like portion 414 lists recommendations for the viewer. The You Might Like portions are programs that are not regularly watched by users. The You Might Like recommendations can be available now or in future. A plurality of thumbnails 424-430 is provided. The thumbnails 424-430 displayed in the You Might Like portion 414 correspond to recommendations from the recommendation engine.

Because the process described is for improving the recommendation engines, feedback may be provided from the set top box users which are ultimately used for changing the algorithms. For example, feedback may be provided if the user selects a thumbnail to view the recommended program. Feedback may also be provided if the user selects a thumbnail to record the program for later viewing. Feedback may also be provided if the user selects a thumbnail to display the program summary and other program details.

Figure 5:
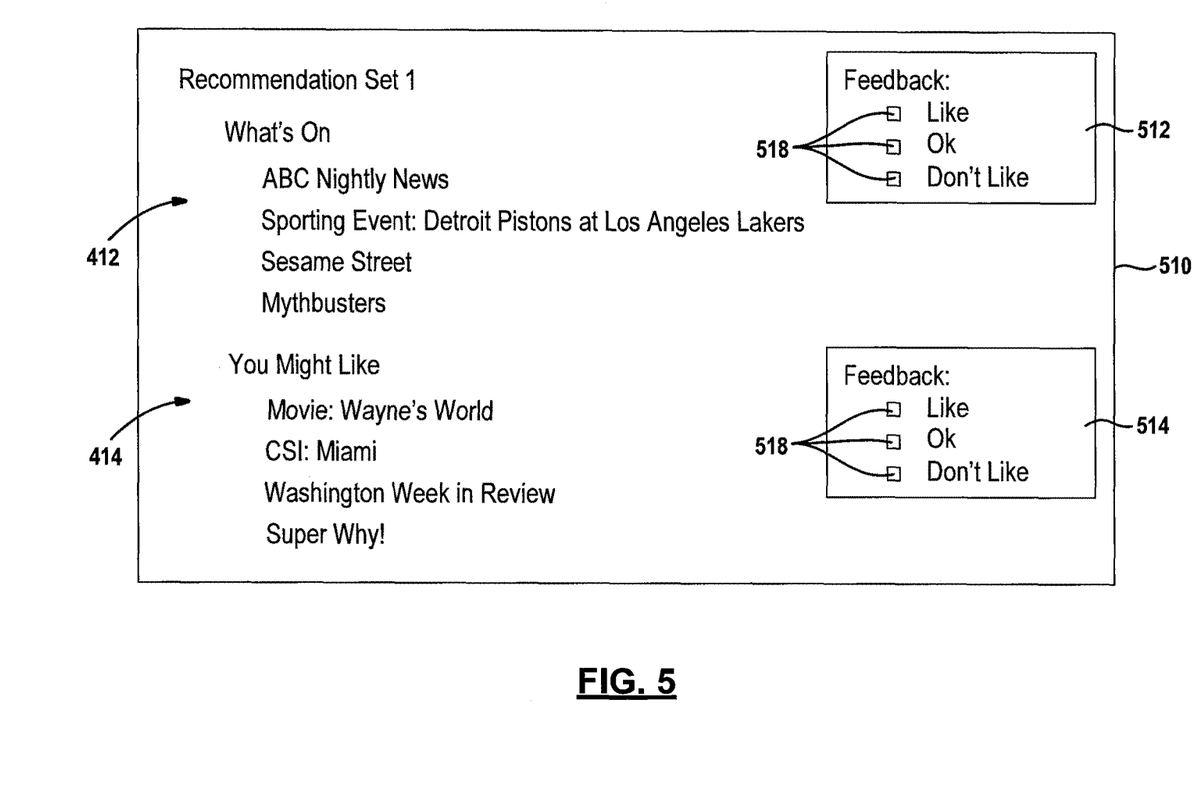
FIG. 5 is a screen display for a test recommendation screen.

Referring now to FIG. 5, a screen display 510 illustrating the recommendations in the What's On portion and You Might Like portions of FIG. 4 are illustrated. Feedback may be provided using a feedback box 512 corresponding to the recommendation set for the What's On portion 412 and a second feedback box 514 corresponding to the You Might Like portion 414 illustrated in FIG. 4. One of a plurality of feedback boxes 518 may be selected to indicate the user's opinion of the recommendations. The feedback boxes 518 may be used to indicate correspondence with the user's opinion of like, neutral response or a dislike of the recommendations. For example, a "like" choice, an "ok" choice, or a "don't like" choice are provided on the screen display 510. Of course, other types of feedback may be provided. Further, feedback may be provided for a general group or may be provided for a specific recommendation. The feedback may then be communicated to the recommendation engine and used to change or modify the recommendation algorithm.

Figure 6:
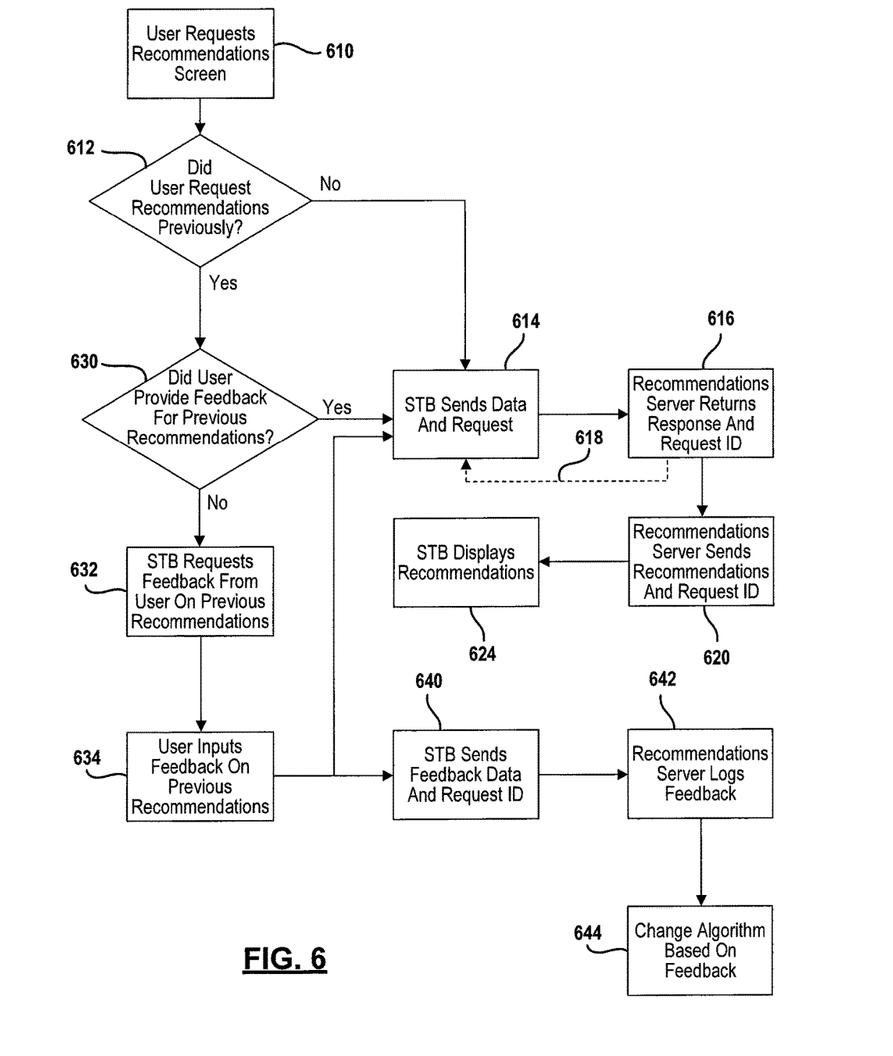
FIG. 6 is a flow chart of a method for generating recommendations according to the present disclosure.

Referring now to FIG. 6, the process of interacting with the user device and the simulation engine 50 is set forth. In step 610 a user enters or navigates to a recommendation interface screen. A certain screen or interface may be generated at the display associated with the set top box. In step 612 it is determined whether the user device has previously requested a recommendation. If the user has not previously requested a recommendation screen step, 614 is performed. In step 614 the set top box sends a data signal and a request signal for recommendations to the simulation engine. The data sent is described above and includes, but is not limited to VTL data, SLI data and APG data. After step 614, the simulation engine returns a response signal and a request identifier to the set top box. The response signal indicates that the request has been received and includes the request identifier.

The response signal is indicated by reference numeral 618. In step 620 the simulation engine and, in particular, the recommendation engine therein sends a recommendation signal and a request identifier to the set top box. The recommendation signal may contain or recommendation file having a plurality of recommended programs. The recommendations are generated from one or more algorithms. In steps after step 620, step 624 displays the recommendation on the set top box. It should be noted that a plurality of algorithms may be used for any one request. That is, various algorithms may be tested simultaneously so that users may be provided the best experience. Different recommendations may thus be provided or using each of the different algorithms.

In step 644 the algorithms may be changed based on the feedback. The algorithms may be changed by changing various parameters of an algorithm or changing to a different algorithm or algorithms.

Referring back to step 612 if the set top box has previously requested communications step 630 is performed. If the user or set top box has provided feedback for previous recommendations steps 614-624 are again performed. If no feedback for previous recommendations has been provided, step 632 is performed. Step 632 requests feedback from the user on previous recommendations. One example of a screen display for requesting feedback is provided in FIG. 5, after step 632, step 634 allows the user of the set top box to provide feedback on previous recommendations.

After step 634, steps 614-624 are again performed which sends the set top box data to the simulation engine. A second request may only require updated data. Also after step 634, step 640 sends feedback data and the request identifier back to the simulation engine. After step 640, step 642 generates a log of the feedback of the recommendations.

Figure 7:
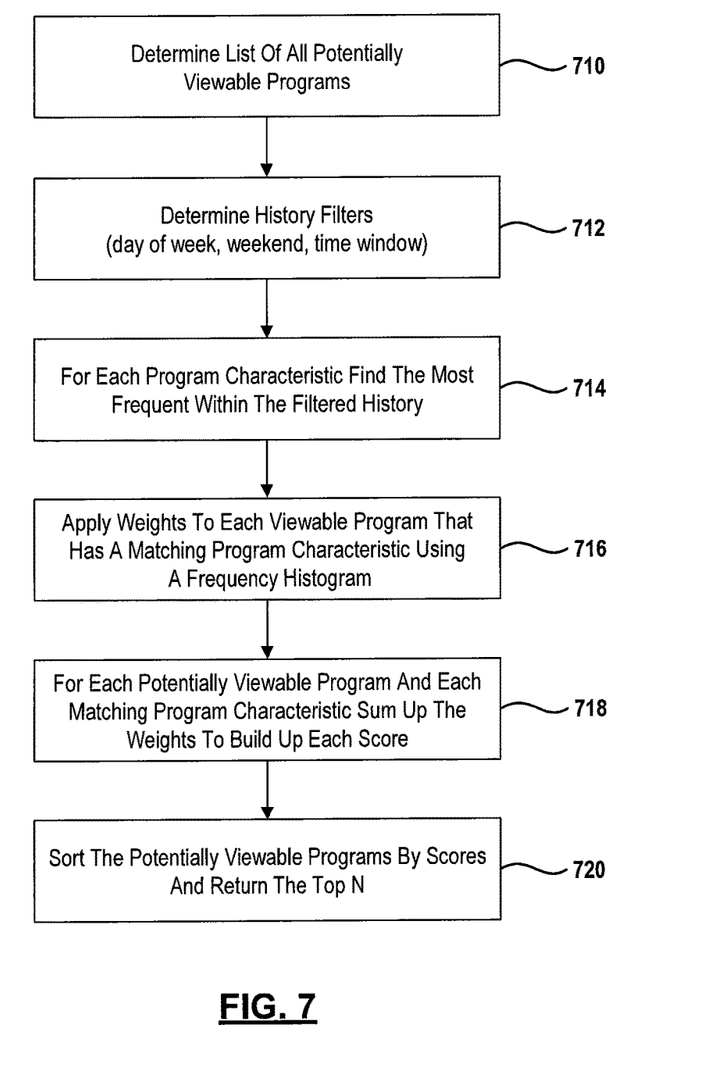
FIG. 7 is a method for generating recommendations according to the present disclosure.

Referring now to FIG. 7, an example of a method for generating a recommendation is set forth. In this example, the various types of data such as but not limited to the viewer tracking log, the setting and list information and the program guide data are provided. In step 710, a list of all potentially viewable programs is generated at using the algorithm.

The list of all potentially viewable programs may be provided based on various settings including the time of day. The potentially available content may be determined from the program guide. The time of day may correspond to a time slot such as a 30 minute time slot used by way of example herein. A score for different item characteristics may be provided. For example, a next program identifier may be used to determine whether to include programs from the next time slot. All programs from the program guide may also be included. The inclusion of pay per view channels may be provided. Also, whether or not a recorded program is in the playlist may also be included. The inclusion of adult content may also be determined. Previously viewed channels may also be another determination. Including local channels or non-local channels may also be used for characteristics for potentially viewable programs. Recently viewed programs may be removed from the potentially reviewable program list. Language settings from the set top box may also be used to determine potentially viewable programs. The number of hours to include programs in the future may also be selected. Further, the potentially viewable programs may also be determined in view of including high definition channels. In step 712 a history filter filters the day of the week, weekend or time window. Thus, the list of all potentially viewable programs is reduced.

In step 714 various program characteristics are used to find the most frequent program characteristic within the filtered history. Each program characteristic may require its own unique algorithm to determine the most frequent set of values. In addition, each program characteristic may have its own setting for the number of frequent numbers to choose. By way of example, the top five channels may be selected but only the top two categories may be selected. After step 714, step 716 applies weights to each viewable program that has a matching program characteristic using a frequency histogram. One way to build a histogram for various program characteristics is to build a frequency histogram from the filtered history data and select the top most frequent program characteristics. Various program characteristics may include a time waited frequency, a channel, a channel group, category, rating, name, descriptor entries, such as actor, director, writer, content identifier, producer and information from outside sources regarding the content. Set top box list that include the SLI data described above, language preferences, daily editorial list, list items, list weights and recommended channel list may also be used to build the histogram.

In steps 718 each potentially viewable program and matching program characteristic weights are summed to build up each score. In step 720 the viewable programs are sorted by scores and the top "N" number of returns are provided.

Figure 8:
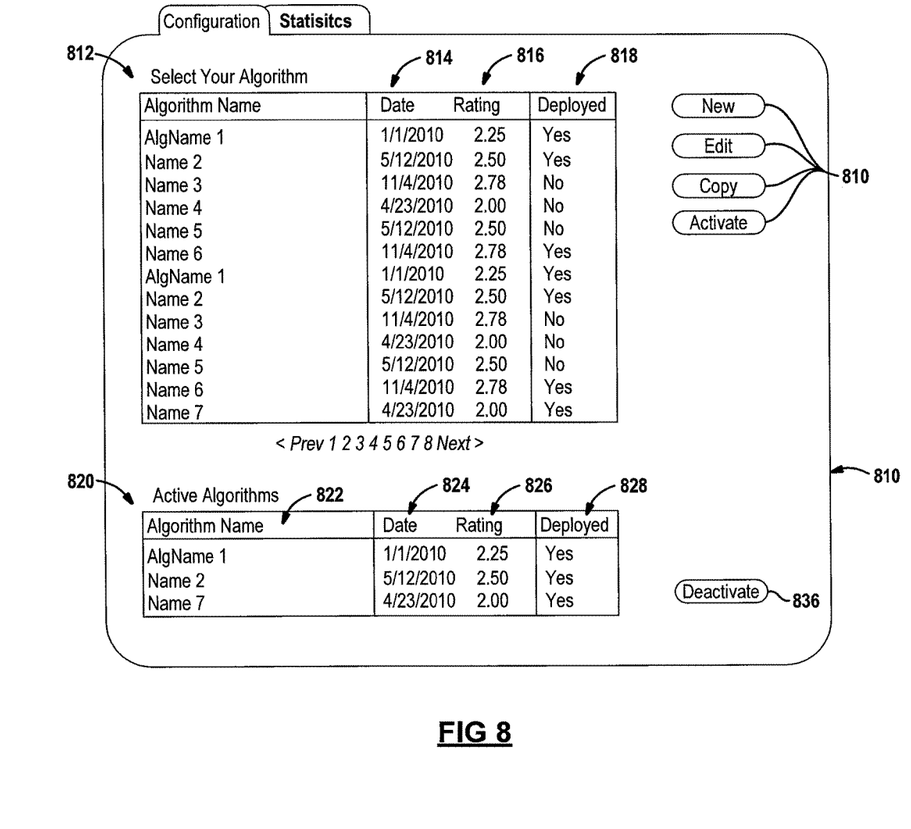
FIG. 8 is a screen display associated with an algorithm configuration.

Referring now to FIG. 8, a screen display 810 illustrating algorithm creation is set forth. Screen display 810 provides a display which, together with the user interface 314 illustrated in FIG. 3 may be used for selecting an algorithm. An algorithm name column 812 is provided with various algorithm names. An algorithm date column 814 illustrates the algorithm creation date. A rating column 816 provides a rating for the algorithm. A deployed column 818 indicates that the algorithms has been used in the past or is not available for editing. An active algorithm portion 820 may be used to show the algorithms currently being used. In this example only three algorithms are provided in the algorithm name column 822. The date column 824 illustrates the date of creation of the algorithm and a rating column 826 generates a rating of the algorithm. In column 828 illustrates that the algorithm is deployed. Various selection buttons, such as new, edit, copy, activate and deactivate are illustrated respectively as reference 830-836. The buttons 830-836 allow the user of the simulation engine to perform various functions.

Figure 9:
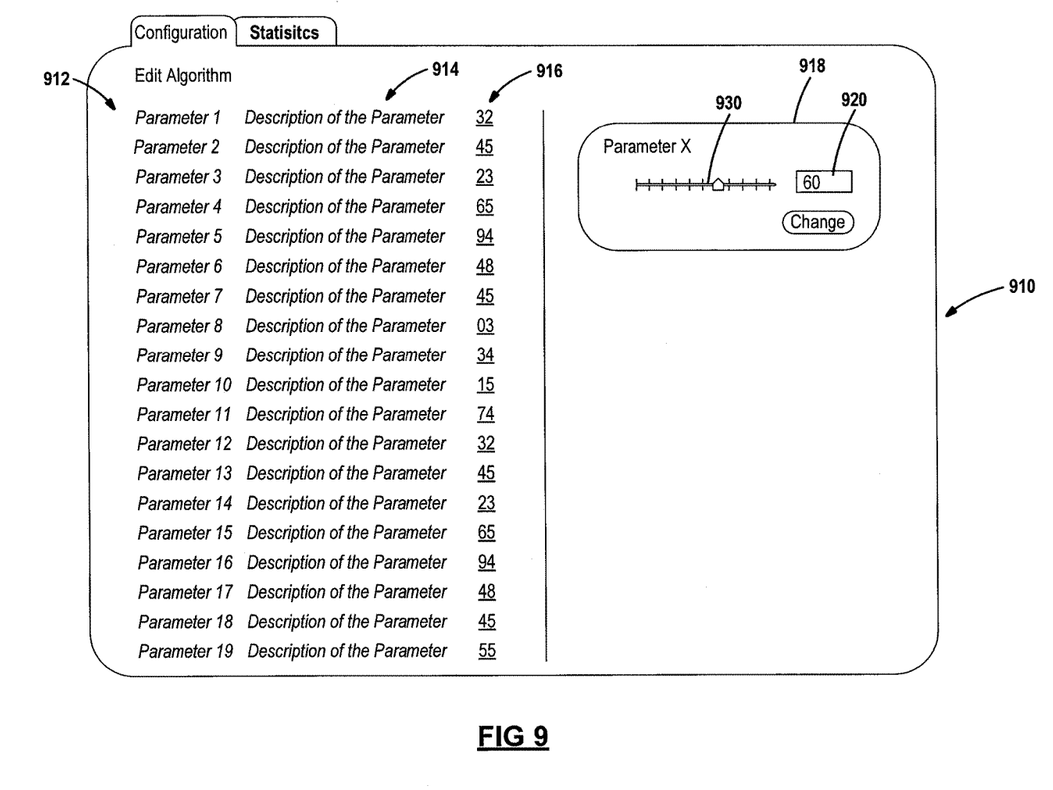
FIG. 9 is a screen display for editing an algorithm for recommendations.

Referring now to FIG. 9, a screen display 910 for editing an algorithm is set forth. In this example in order to preserve data about past recommendations, existing algorithms that have been used may not be able to be modified. In this example, a list of parameters 912 is provided with a description of the parameter. In column 914 the weight associated with the perimeter is also provided in step 916. A change box 918 is provided which allows a perimeter to be selected from column 912 and the weight changed in weight box 920. A parameter slide 930 may be used to adjust the weight old parameter.

Figure 10:
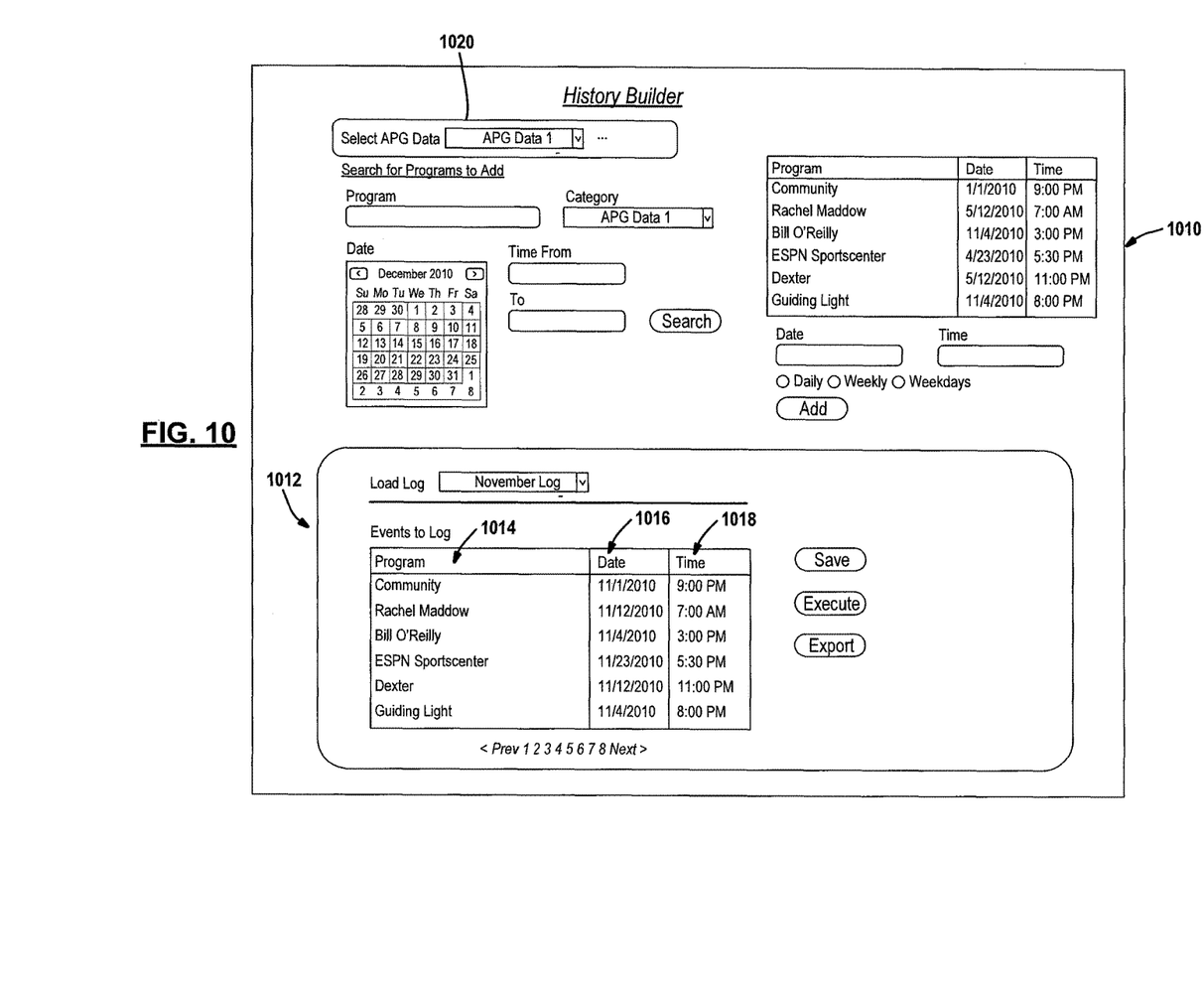
FIG. 10 is a screen display for creating history data according to the present disclosure.

Referring now to FIG. 10, a history builder screen display 1010 is set forth. In this example, a load log 1012 having various programs 1014, dates 1016 and times 1018 is displayed. These programs may be displayed for a particular program guide data set as illustrated by 1020. In this example, an algorithm is run on a particular data set.

Figure 11:
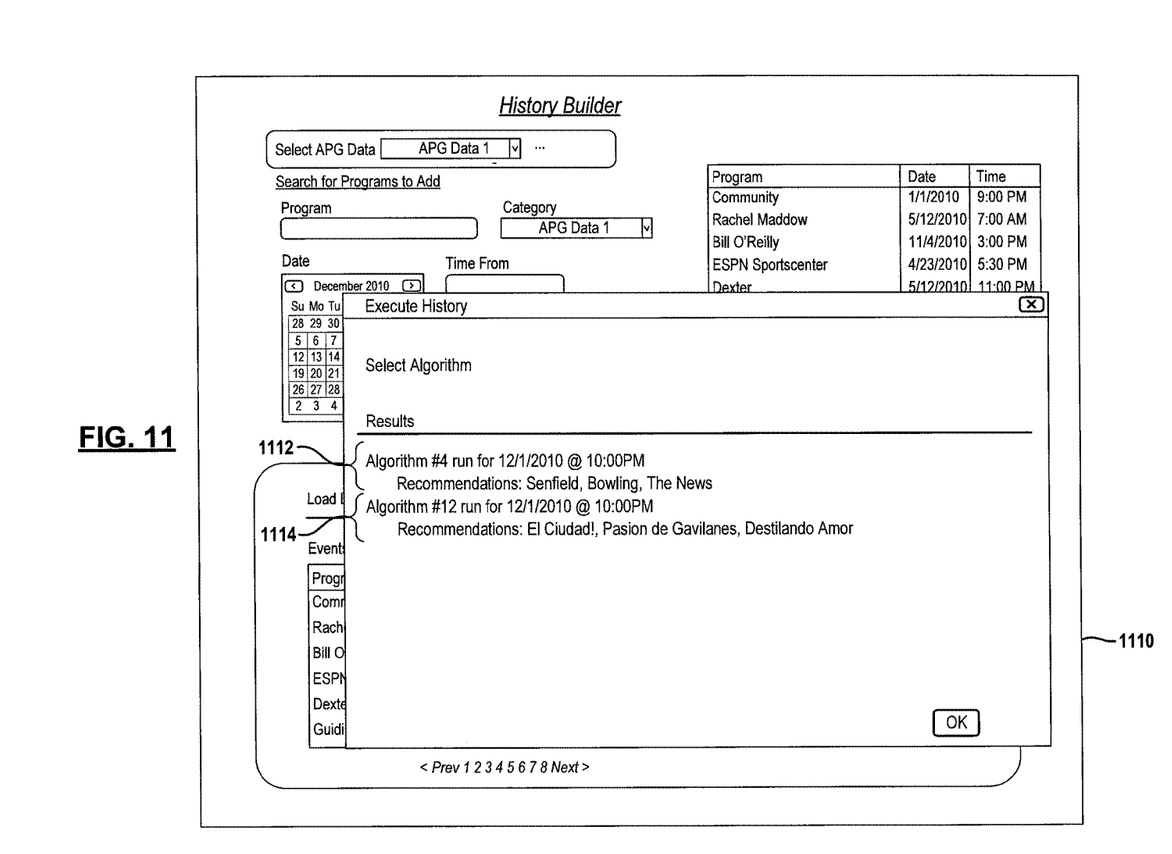
FIG. 11 is a screen display execution results according to the present disclosure.

Referring now to FIG. 11, a sample algorithm execution screen and results 1110 is illustrated. In this example, the results illustrate that algorithm four was run and that three recommendations have been provided in 1112. A second portion 1114 illustrates that algorithm 12 has been run and three different recommendations have been provided.

By selecting different algorithms and tweaking the various perimeters within the algorithm, the algorithms may be adjusted to better provide recommendations. The algorithm change only occurs within the simulation engine 50, and different recommendations would appear in a set top box 22. No software change is needed for the set top box 22.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
communicating from a user device data through a network to a simulation engine comprising a web interface, a processor-based recommendation engine, a recommendation processing database and an algorithm file;
communicating a recommendation request from the user device to the web interface of the simulation engine through the network;
generating, via a simulation algorithm, a content recommendation at a recommendation engine of the simulation engine based on the data and in response to the recommendation request;
communicating the content recommendation to the user device through the network;
rating the simulation algorithm at the user device based on the content recommendation;
communicating the rating to the simulation engine through the network;
comparing the rating to a plurality of ratings of a plurality of algorithms using the recommendation processing database, wherein the plurality of algorithms include a second algorithm;
based on the comparing, selecting, from the algorithm file of the simulation engine and the plurality of algorithms, the second algorithm having a better rating than other ones of the simulation algorithm and the plurality of algorithms; and
changing the simulation algorithm at the simulation engine in response to the rating.

2. A method as recited in claim 1 further comprising generating a request identifier at the simulation engine in response to the recommendation request and wherein communicating the recommendation rating comprises communicating the recommendation rating and the request identifier to the simulation engine.

3. A method as recited in claim 1 wherein communicating data comprises communicating set top box data.

4. A method as recited in claim 1 wherein communicating data comprises communicating setting and list data comprising at least one of set top box playlist data, channel subscription data and channels blocked at the user device.

5. A method as recited in claim 1 wherein communicating data comprises communicating view tracking log data comprising at least one of a time of day that a program is watched, how long a program is watched and program recording deletion data.

6. A method as recited in claim 1 wherein communicating the content recommendation comprises communicating a program object identifier, a channel identifier and a program start time and wherein generating the content recommendation comprises generating the content recommendation based on the data, the simulation algorithm and program guide data.

7. A method as recited in claim 1 wherein communicating the content recommendation comprises communicating a plurality of content recommendations regularly watched and currently available for a time slot.

8. A method as recited in claim 1 wherein communicating the content recommendation comprises communicating a plurality of new content recommendations related to regularly watched programs for a time slot for currently available or upcoming programming.

9. A method as recited in claim 1 further comprising generating a screen display on a display associated with one of a plurality of user devices, wherein the screen display includes regularly watched programs for a time slot and new recommendations currently available or upcoming programming.

10. A simulation engine in communication with a plurality of set top boxes, wherein the simulation engine comprises:
an algorithm file;
a web interface receiving, from at least one of the plurality of set top boxes and through a network, data and a recommendation request;
a memory storing the data therein; and
a processor-based recommendation engine originating, via a simulation algorithm, a content recommendation based on the data and in response to the recommendation request,
wherein said web interface communicates the content recommendation to the plurality of set top boxes; and
wherein said recommendation engine receives, based on the content recommendation, ratings of the simulation algorithm from the plurality of set top boxes and changes the simulation algorithm to a second algorithm from the algorithm file in response to the ratings from the plurality of set top boxes and generates different recommendations for the plurality of set top boxes using a recommendation processing database without changing software at the plurality of set top boxes.

11. A simulation engine as recited in claim 10 wherein the data comprises set top box data.

12. A simulation engine as recited in claim 10 wherein the data comprises setting and list data comprising at least one of set top box playlist data, channel subscription data, channels blocked at the at least one of the plurality of set top boxes and resolution data.

13. A simulation engine as recited in claim 10 wherein communicating data comprises communicating viewer tracking log data comprising at least one of data indicating a time of day a program is watched, data indicating how long a program is watched and recording deletion data.

14. A simulation engine as recited in claim 10 wherein the content recommendation comprises a program object identifier, a channel identifier and a program start time.

15. A simulation engine as recited in claim 10 wherein the recommendation engine generates the content recommendation at the plurality of set top boxes based on the simulation algorithm and program guide data.

16. A method as recited in claim 1 wherein the content recommendation comprises a list of recommendations for a plurality of programs respectively corresponding to a plurality of channels.

17. A method of operating a simulation engine having a web interface comprising:
receiving data and a recommendation request from at least one of a plurality of user devices and through a network and the web interface;
storing the data in a memory of the simulation engine;
originating, via a simulation algorithm of a processor-based recommendation engine, a content recommendation based on the data and in response to the recommendation request,
communicating, from the interface, the content recommendation to the plurality of user devices; and
receiving, at the recommendation engine, based on the content recommendation, ratings of the simulation algorithm from the plurality of user devices and changes the simulation algorithm to a second algorithm in response to the ratings from the plurality of user device and generates different recommendations for the plurality of user devices using a recommendation processing database without changing software at the plurality of user device.

18. A method as recited in claim 17 wherein communicating data comprises communicating setting and list data comprising at least one of set top box playlist data, channel subscription data, channels blocked at the user device, viewer tracking log comprising at least one of a time of day that a program is watched, how long a program is watched and program recording deletion data.

19. A method as recited in claim 17 wherein communicating data comprises communicating view tracking log data comprising at least one of a time of day that a program is watched, how long a program is watched and program recording deletion data.

20. A method as recited in claim 17 wherein communicating the content recommendation comprises communicating a program object identifier, a channel identifier and a program start time and wherein generating the content recommendation comprises generating the content recommendation based on the data, the simulation algorithm and program guide data.

21. A method as recited in claim 17 wherein the content recommendation comprises a list of recommendations for a plurality of programs respectively corresponding to a plurality of channels.

22. A system comprising:
a user device communicating data through a network to a simulation engine through a web interface;
said user device communicating a recommendation request to the simulation engine through the network;
a simulation algorithm generating a content recommendation at a processor-based recommendation engine of the simulation engine based on the data and in response to the recommendation request and communicating the content recommendation to the user device through the network;
said user device rating the simulation algorithm based on the content recommendation and communicating the rating to the simulation engine through the network;
said simulation engine comparing the rating to a plurality of ratings of a plurality of algorithms using a recommendation processing database, wherein the plurality of algorithms include a second algorithm;
said simulation engine, based on comparing, selecting, from an algorithm file of the simulation engine and the plurality of algorithms, the second algorithm having a better rating than other ones of the simulation algorithm and the plurality of algorithms; and
changing the simulation algorithm at the simulation engine in response to the rating.

23. A system as recited in claim 22 wherein the data comprises set top box data.

24. A system as recited in claim 22 wherein the data comprises setting and list data comprising at least one of set top box playlist data, channel subscription data, channels blocked at the user device and resolution data.

25. A system as recited in claim 22 wherein communicating data comprises communicating viewer tracking log data comprising at least one of data indicating a time of day a program is watched, data indicating how long a program is watched and recording deletion data.

26. A system as recited in claim 22 wherein the content recommendation comprises a program object identifier, a channel identifier and a program start time.

27. A system as recited in claim 22 wherein the recommendation engine generates the content recommendation at the user device based on the simulation algorithm and program guide data.

* * * * *